Oct. 5, 1965  G. A. KLATCHKO  3,209,590
MACHINE FOR FATIGUE TESTING SPRINGS
Filed Feb. 6, 1963  2 Sheets-Sheet 1

INVENTOR.
GEORGE A. KLATCHKO
BY
Douglas R. McKenzie
ATTORNEY

Oct. 5, 1965  G. A. KLATCHKO  3,209,590
MACHINE FOR FATIGUE TESTING SPRINGS
Filed Feb. 6, 1963  2 Sheets-Sheet 2

INVENTOR.
GEORGE A. KLATCHKO
BY
Douglas R. McKechnie
ATTORNEY

United States Patent Office

3,209,590
Patented Oct. 5, 1965

1

3,209,590
MACHINE FOR FATIGUE TESTING SPRINGS
George A. Klatchko, Levittown, Pa., assignor to The Budd Company, Philadelphia, Pa., a corporation of Pennsylvania
Filed Feb. 6, 1963, Ser. No. 256,597
9 Claims. (Cl. 73—161)

This invention relates to a machine for fatigue testing springs by subjecting a test spring to a cyclic stress condition.

As is well known, many types of springs are used under conditions where they are subject to cyclically varying stresses and quite often these springs fail through fatigue when the values of the maximum cyclic stresses are well below those of the maximum static stresses which the springs can withstand. Hence, it is desirable to be able to test springs, either for design or for quality control purposes, to determine the endurance strength of such items.

Accordingly, one of the objects of the invention is to provide a novel machine for fatigue testing springs.

Another object is to provide a spring fatigue testing machine wherein movable parts are balanced to minimize vibration.

Still another object is to provide a spring fatigue testing machine which is adjustable so as to be able to test different size springs under different load conditions.

Figure 1:
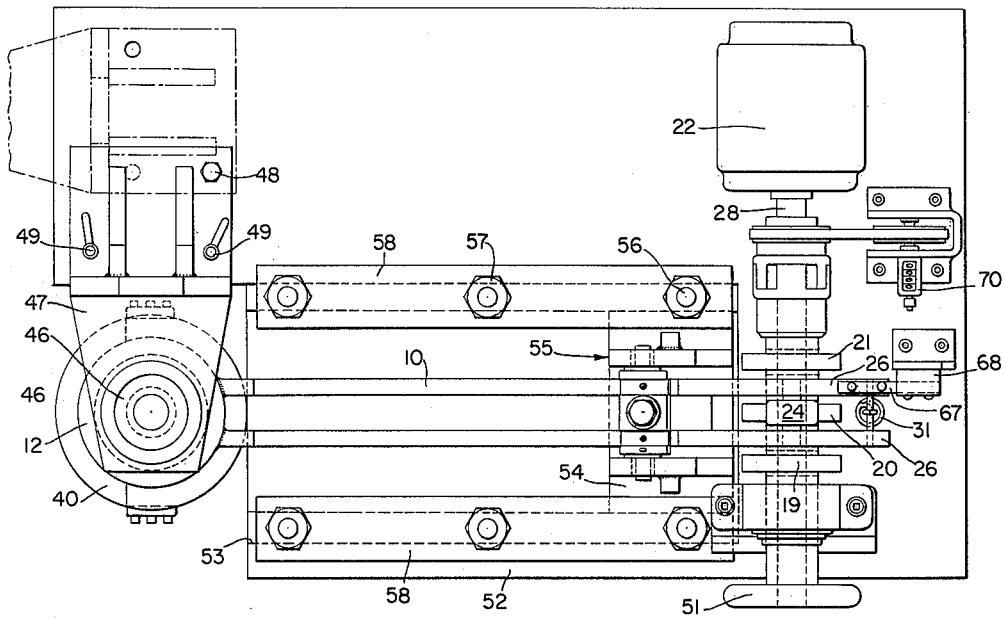
Figure 2:
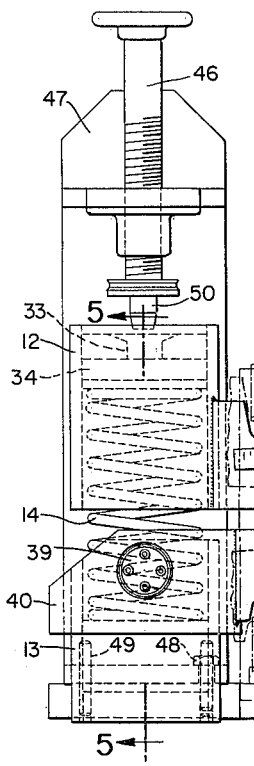
Figure 2:
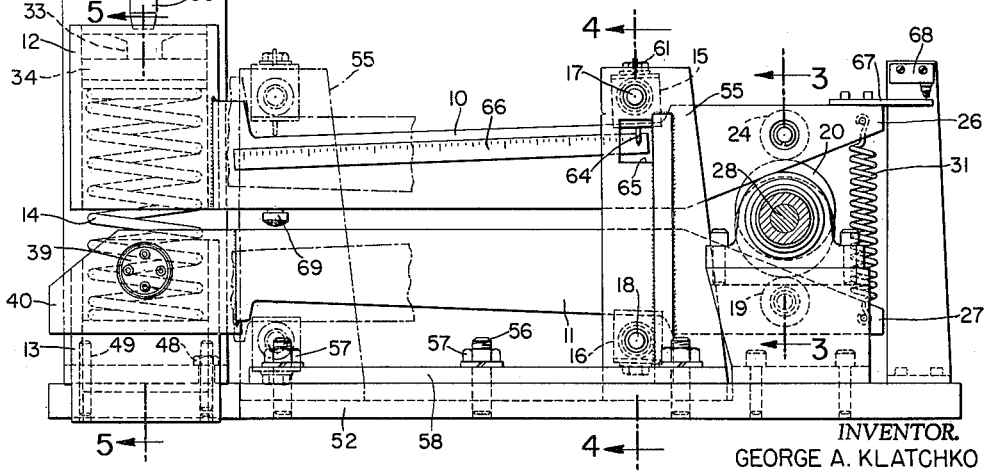
Figure 5:
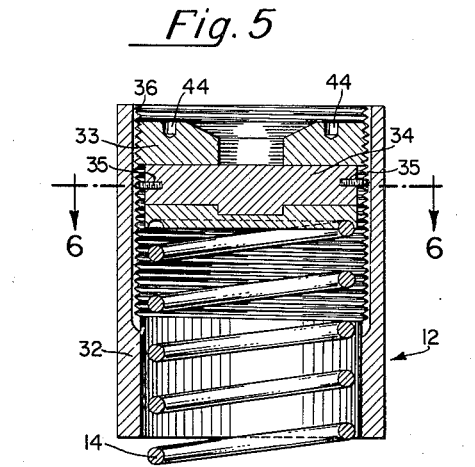
Figure 3:
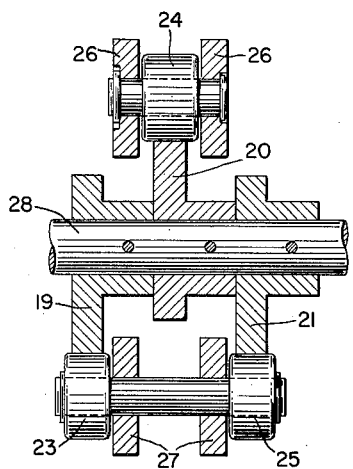
Figure 4:
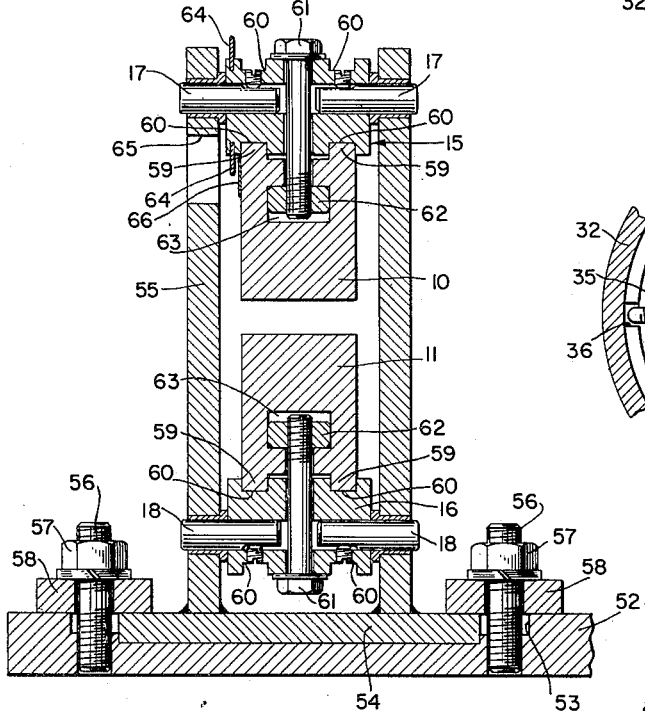
Figure 6:
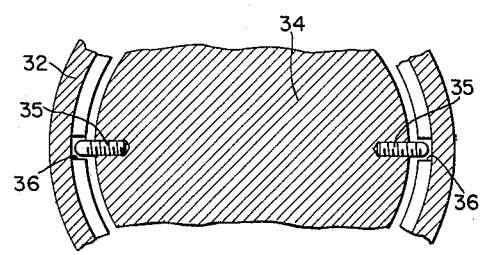

Other objects and advantages of the invention will be apparent from the following description taken in connection with the accompanying drawings wherein:

FIGS. 1 and 2 are top plan and side elevational views, respectively, of a spring testing machine embodying the invention;

FIGS. 3–5 are vertical sectional views, on enlarged scales relative to those of FIGS. 1 and 2 for clarity, taken along reference lines 3—3, 4—4 and 5—5, respectively, of FIG. 2; and FIG. 6 is a sectional view taken along reference lines 6—6 of FIG. 5.

Referring now to the drawings, the illustrated testing machine comprises a pair of load arms 10 and 11 which carry a pair of holders 12 and 13 adapted to hold or support a test specimen or spring 14. The load arms are mounted on a pair of vertically spaced trunnions 15 and 16 for oscillatory movement about parallel, vertically-spaced axes that extend through pivots 17 and 18 of the trunnions.

The load arms are oscillated by three circular, eccentric cams 19, 20 and 21 pinned to a shaft 28 coupled to and driven by a variable speed motor 22. The cams engage a plurality of cam followers 23, 24 and 25 carried by bifurcated ends 26 and 27 of load arms 10 and 11. Cam follower 24 is between the bifurcated legs of end 26 and above shaft 28 whereas cam followers 23 and 25 are outside of the legs of end 27 and below shaft 28.

The centers of cams 19 and 21 lie along a line parallel to the axis of rotation of the cams and the center of cam 20 lies in the plane which contains this line and the axis of rotation. The center of cam 20 is the same distance from but on the opposite side of the axis of rotation and the center of cams 19 and 21 whereby rotation of shaft 28 at a constant speed causes cams 19, 20 and 21 to actuate cam followers and cause load arms 10 and 11 to oscillate sinusoidally in unison so that the free ends thereof move holders 12 and 13 towards and away from each other and thereby alternately compress and relieve the compression, or cyclically stress spring 14.

During the testing of spring 14, when the holders move towards each other, the driving force for moving the load arms comes from motor 22 whereas when the holders move apart, the driving force comes from the test spring 14. A helical tension spring 31 is provided for holding the cam followers against the cams when the machine is at rest and not in use but the strength of this spring is considerably less than that of a test spring so as to have a negligible effect on the operation even though its force produces moments on the load arms in the same directions as the test spring.

The load arms and holders are preferably balanced in weight, by using weights, counter-weights, or a judicious selection of light and heavy materials, so that the inertial forces cancel or at least greatly minimize each other and thereby minimize vibration of the machine.

As best seen in FIG. 5, holder 12 is cup-shaped and comprises an internally threaded sleeve 32 which receives a threaded ring 33 and a spring rest 34. The spring rest is held against rotation by a pair of set screws 35 that are slidingly received in a pair of longitudinal grooves 36. These grooves terminate above the lower end of the sleeve to retain the spring rest in the sleeve when there isn't any test spring in the holders. Sleeve 32 is welded to the free end of load arm 10.

Holder 13 is similar to holder 12 because it also includes a sleeve 32', a ring 33' and a spring rest 34' but it differs because it is swivelled and includes a load cell 37, a load cell cage 38 and mounting means therefor. Sleeve 32' is pivoted on pins 39 secured to an annulus 40 welded to the end of arm 11 so that the holder 13 is free to pivot about a horizontal axis that extends transversely of arm 11.

Load cell 37 can be of any conventional construction which provides a resistance reading proportional to the force imposed thereon. The load cell is bolted via bolts 41 to a circular plate 42 which rests on ring 33'. Cage 38 is cup-shaped and fits over the upper end of the load cell. The lower end of cage 38 is connected to spring rest 34' and the spring rest is connected to bolts 43 which slidably extend through suitable apertures in plate 42. The load imposed on spring rest 34' is below both the upper end of the load cell and pins 39 so that the cage centers itself on the load cell and the transmitted force is along the axis of and perpendicular to the load cell.

A test spring can be loaded in the machine by removing ring 33 and rest 34, inserting the lower end of the spring through sleeve 32 and into holder 13, and then replacing ring 33 and spring rest 34. Ring 33 has a pair of blind holes 44 adapted to be engaged by a suitable wrench so that the ring can be tightened against a test spring. For light springs, ring 33 can be rotated to preload the spring, but, for heavy springs, a preload-facilitating device is provided, the device including a hand-wheel-operated screw 46 mounted on a support 47 which is pivoted on a pin 48 for movement between operative and inoperative positions illustrated by the full lines and the dotted lines, respectively, in FIG. 1. A pair of removable lock pins 49 are provided for locking support 47 in these positions.

Screw 46 provides a mechanical advantage for preloading the test spring and has a tip 50 engageable with the spring rest 34. A test spring can be preloaded in the following manner. First, the spring is loaded as pointed out above and shaft 28 is turned by a hand wheel 51 to compress the spring. Then, support 47 is swung to its operative position and screw 46 and ring 33 are alternately tightened to compress and preload the spring the desired amount whereupon screw 46 can be withdrawn and swung out of the way.

The testing machine also includes a horizontal base plate 52 having a shallow recess 53 which receives the base 54 of a vertical support 55 that supports trunnions 15 and 16. Base 54 is rigidly held in recess 53 by a pair of laterally spaced clamping bars 58 bolted to the base plate by stud bolts 56 and nuts 57. When nuts 57 are loosened, base 54 is slidable along recess 53 in a direction parallel to the load arms. The base plate is cut out beneath holder 13 to provide suitable clearance and it is intended that the base plate be mounted on a table in such a manner as to provide suitable clearance for movement of holder 13.

Each load arm has a pair of parallel rails 59 which fit into a pair of mating grooves 60 on the associated trunnion. Each trunnion has two pair of grooves 60 located at different distances from the pivots. Each trunnion is secured to a load arm by a bolt 61 which engages a captive nut 62 held against rotation in a slot 63 in the load arm but slidable through the slot along the length of the load arm. When bolts 61 are loosened, the trunnions are slidable relative to the load arms. Thus, by loosening nuts 57 and bolts 61 and simultaneously restraining the load arms against any horizontal longitudinal movement, support 55 can be moved along recess 53 to vary the distance between shaft 28 and the pivotal axes of rotation of load arms 10 and 11 and thereby vary the stroke of holders 12 and 13. A pointer 64 is carried by trunnion 15 and is viewed through a hole 65 in the support in comparison to a scale 66 carried by load arm 10, the scale indicating the length of stroke.

In each trunnion, each pair of grooves 60 is located a different distance from the pivots of the trunnion so that by removing bolts 61, the trunnions can be turned around. This construction provides a two step adjustment for acommodating different lengths of springs in the holders since by varying the distance between the load arms and the axes of pivots 17 and 18 the distance between the load arms is also varied.

FIG. 2 illustrates the positions of trunnions 15 and 16 at the extreme limits of the stroke length and the spring length adjustments they provide. When the trunnions are located in their right hand positions as viewed in FIG. 2, they provide the longest stroke and the shortest distance between the load arms whereas in the left hand position, the trunnions are inverted and provide the shortest stroke for the longest distance. It is to be also noted that the threaded rings 33 and 33′ also provide adjustment for accommodating different length springs.

Lastly, the illustrated testing machine further includes: a rubber bumper 69 between the load arms preventing direct engagement thereof; a counter 70 for counting the revolutions of the shaft 28 and hence the number of testing cycles; and a trigger 67 mounted on the upper side of end 26 for actuating a limit switch 68 upon failure of a test specimen. The limit switch is arranged to shut off the testing machine and is operated because, when a test spring fails, the cam follower 24 momentarily disenages cam 20 at the top of its path of travel and thereby causes trigger 67 to move out of its normal range of travel and actuate the switch.

The machine is susceptible to two types of load analysis, direct load deflection method and a load cell readout method. Under the load deflection method, the test load is established by measuring the length of the test stroke, and the length of compressive pre-loading if any, and comparing these measurements with a load deflection curve to determine the actual load rate. In the load cell readout method, the load cell produces an output proportional to the force acting thereon and this can be fed to some suitable recording apparatus or console.

While only a single embodiment has been illustrated, it will be apparent to those skilled in the art that many changes can be made in the details of construction and the arrangement of parts without departing from the scope of the invention as defined in the appended claim.

What is claimed is:

1. In a machine for fatigue testing a spring, the combination of: two adjacent load arms; first means mounting said load arms for oscillating movement about parallel axes located between the ends of said load arms; a first holder mounted at one end of one of said load arms for movement therewith, a second holder mounted for swivelling movement on the adjacent end of the other of said load arms, said first and second holders being adapted to support a test spring therebetween; second means engaging the other ends of said load arms for oscillating said load arms in unison so as to move said first and second holders towards each other to compress said spring therebetween and alternately away from each other under the reaction of said spring to relieve the compression of said spring, and a load cell mounted on said second holder so as to receive axial forces from said spring.

2. A testing machine in accordance with claim 1 wherein said first means comprises a pair of vertically spaced trunnions mounted on a support, and said testing machine further includes a base plate supporting said support.

3. A testing machine in accordance with claim 2 wherein said support and said trunnions are adjustable to vary the positions of said axes along the lengths of said load arms, and thereby vary the stroke length of said holders.

4. A testing machine in accordance with claim 2 wherein each of said trunnions comprises a pair of opposite portions selectively engaged with the associated load arm, pivot pin means located between said portions but at different distances therefrom, and releasable fastening means for securing said trunnion to said load arm whereby one of said portions is engaged therewith.

5. A testing machine in accordance with claim 1 wherein said second means comprises a horizontal, rotary shaft which extends between said other ends parallel to said parallel axes.

6. A testing machine in accordance with claim 1 wherein each of said holders comprises an internally threaded sleeve, a spring rest in said sleeve, and a threaded ring in said sleeve, said spring rest being slidable relative to said sleeve and adapted to be biased by said test spring towards said ring.

7. A testing machine in accordance with claim 6 and including a preloading device mounted for movement between an operative position and an inoperative position, said device comprising a driven member adapted to engage one of said spring rests, when said device is in said operative position, to preload said test spring.

8. In apparatus for fatigue testing a compression spring, the combination of: two elongated, generally-parallel, adjacent load arms pivotally mounted for oscilatory movement about parallel axes; two holders mounted on adjacent ends of said arms, said holders opening towards each other and being adapted to hold said compression spring being tested; and means for repetitiously cyclically stressing said spring by repeatedly alternately compressing and relieving the compression of said spring, said means comprising driving means connected to said arms for oscillating them in unison so as to move said holders towards each other to compress said spring and alternately away from each other under reaction of said spring to relieve the compression of said spring.

9. In apparatus for fatigue testing a compression spring, the combination of: two cup-shaped holders adapted to hold said spring therebetween; two load arms having adjacent ends connected to and supporting said holders for simultaneous movement towards and away from each other so as to cyclically stress said spring, said holders and said load arms being balanced so that the inertial forces thereof cancel each other and thereby minimize vibration; first means mounting said load arms for oscillatory movement about parallel axes equidistant from said holders and between the ends of said load arms; continuously driven rotary cam means engaged with the other ends of said arms and operative to cyclically oscillate said arms and repetitiously alternately compress said spring between said holders and relieve the compression of said spring.

References Cited by the Examiner

UNITED STATES PATENTS

| | | | |
|---|---|---|---|
| 719,390 | 1/03 | Stockall | 74—54 X |
| 2,192,474 | 3/40 | Kissam. | |
| 2,381,241 | 8/45 | Wilcox | 73—161 |
| 2,930,943 | 3/60 | Ruge | 73—161 X |

FOREIGN PATENTS

| | | |
|---|---|---|
| 208,106 | 3/60 | Austria. |
| 1,213,070 | 10/59 | France. |

RICHARD C. QUEISSER, *Primary Examiner.*